(12) United States Patent
Zweigle et al.

(10) Patent No.: US 9,819,227 B2
(45) Date of Patent: Nov. 14, 2017

(54) STATE TRAJECTORY PREDICTION IN AN ELECTRIC POWER DELIVERY SYSTEM

(71) Applicant: Schweitzer Engineering Laboratories, Inc., Pullman, WA (US)

(72) Inventors: Gregory C. Zweigle, Pullman, WA (US); Eric J. Hewitt, Moscow, ID (US); Ellery A. Blood, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 797 days.

(21) Appl. No.: 14/190,470

(22) Filed: Feb. 26, 2014

(65) Prior Publication Data

US 2014/0244058 A1    Aug. 28, 2014

Related U.S. Application Data

(60) Provisional application No. 61/769,487, filed on Feb. 26, 2013.

(51) Int. Cl.
*H02J 13/00*    (2006.01)
*G05D 3/12*    (2006.01)
*H02J 3/00*    (2006.01)

(52) U.S. Cl.
CPC ....... *H02J 13/001* (2013.01); *H02J 2003/001* (2013.01); *H02J 2003/003* (2013.01);
(Continued)

(58) Field of Classification Search
CPC .......... Y04S 10/18; Y04S 10/30; Y04S 10/40; Y04S 10/54; Y04S 10/525; H02J 13/001;
(Continued)

(56) References Cited

U.S. PATENT DOCUMENTS 4,084,103 A * 4/1978 Burns, III ............. H02M 3/157
                                                    307/132 EA
5,222,009 A    6/1993 Scharnick
(Continued)

OTHER PUBLICATIONS

Borhan et al., "MPC-Based Energy Management of a Power-Split Hybrid Electric Vehicle", IEEE, 2012, 11pg.*
(Continued)

*Primary Examiner* — Ryan Coyer
(74) *Attorney, Agent, or Firm* — Jared L. Cherry

(57) ABSTRACT

Disclosed is state trajectory prediction in an electric power delivery system. Electric power delivery system information is calculated from measurements by intelligent electronic devices (IEDs), and communicated to a state trajectory prediction system. The state trajectory prediction system may be configured to generate a load prediction profile. The load prediction profile may provide a predicted response of a load at a future time. Further, the state trajectory prediction system may be configured to generate a generator prediction profile that provides a predicted response of a generator at a future time. The state trajectory prediction system may generate a state trajectory prediction based, at least in part, on the load prediction profile and the generator prediction profile. The state trajectory prediction may represent a future state of the electric power delivery system.

27 Claims, 7 Drawing Sheets

(52) U.S. Cl.
CPC .............. *Y02E 60/724* (2013.01); *Y02E 60/74* (2013.01); *Y04S 10/18* (2013.01); *Y04S 10/30* (2013.01); *Y04S 10/40* (2013.01); *Y04S 10/525* (2013.01); *Y04S 10/54* (2013.01)

(58) Field of Classification Search
CPC .......... H02J 2003/001; H02J 2003/003; Y02E 60/74; Y02E 60/724
USPC ........................................................ 700/291
See application file for complete search history.

(56) References Cited

U.S. PATENT DOCUMENTS

| | | | | |
|---|---|---|---|---|
| 5,963,457 | A * | 10/1999 | Kanoi | H02J 3/00 340/870.03 |
| 6,574,740 | B1 * | 6/2003 | Odaohhara | G06F 1/32 713/320 |
| 7,096,175 | B2 * | 8/2006 | Rehtanz | H02J 3/24 700/293 |
| 7,457,088 | B2 | 11/2008 | Hou | |
| 7,999,405 | B2 | 8/2011 | Peterson | |
| 8,554,382 | B2 * | 10/2013 | Hindi | H02J 3/14 700/29 |
| 8,849,737 | B1 * | 9/2014 | Engler | G06N 5/02 706/13 |
| 9,383,735 | B2 | 7/2016 | Schweitzer | |
| 2002/0135962 | A1 * | 9/2002 | Tang | G06F 1/305 361/111 |
| 2003/0220740 | A1 * | 11/2003 | Intriligator | G01W 1/10 702/3 |
| 2004/0247059 | A1 * | 12/2004 | Seto | H04B 1/7097 375/346 |
| 2004/0257059 | A1 | 12/2004 | Mansingh | |
| 2005/0099747 | A1 * | 5/2005 | Zima | G05B 13/048 361/62 |
| 2005/0125104 | A1 * | 6/2005 | Wilson | H02J 3/06 700/295 |
| 2006/0195229 | A1 | 8/2006 | Bell | |
| 2008/0109205 | A1 * | 5/2008 | Nasle | G06F 17/5009 703/18 |
| 2009/0076661 | A1 | 3/2009 | Pearson | |
| 2009/0076749 | A1 * | 3/2009 | Nasle | G05B 17/02 702/62 |
| 2009/0204245 | A1 * | 8/2009 | Sustaeta | G05B 13/024 700/99 |
| 2010/0013632 | A1 | 1/2010 | Salewske | |
| 2010/0063641 | A1 | 3/2010 | Scholten | |
| 2010/0204844 | A1 * | 8/2010 | Rettger | H02J 3/06 700/291 |
| 2011/0035065 | A1 | 2/2011 | Schweitzer | |
| 2011/0066301 | A1 | 3/2011 | Donolo | |
| 2011/0125293 | A1 * | 5/2011 | Havlena | G05B 13/048 700/30 |
| 2011/0202467 | A1 | 8/2011 | Hilber | |
| 2012/0098345 | A1 | 4/2012 | Oldenburg | |
| 2012/0331082 | A1 | 12/2012 | Smith | |
| 2013/0066482 | A1 | 3/2013 | Li | |
| 2013/0088239 | A1 | 4/2013 | Mynam | |
| 2013/0107401 | A1 | 5/2013 | Helt | |
| 2013/0113285 | A1 * | 5/2013 | Hyde | H02J 3/14 307/35 |
| 2013/0138257 | A1 | 5/2013 | Edenfeld | |
| 2013/0138260 | A1 | 5/2013 | Divan et al. | |
| 2013/0274940 | A1 | 10/2013 | Wei | |
| 2014/0001977 | A1 | 1/2014 | Zacharchuk | |
| 2015/0281287 | A1 | 10/2015 | Gill | |
| 2015/0380937 | A1 | 12/2015 | Forbes | |
| 2016/0226248 | A1 | 8/2016 | Mosebrook | |

OTHER PUBLICATIONS

Wen et al., "Optimal Coordinated Voltage Control for Power System Voltage Stability", IEEE, 2004, 8pg.*
"Reliability Assessment Guidebook", ver. 1.2, North American Electric Reliability Corporation, Mar. 18, 2008, 129 pg.*
Da Silva et al., "State forecasting in electric power systems", IEE, 1983, 8pg.*
Mathieu et al,. "State Estimation and Control of Electric Loads to Manage Real-Time Energy Imbalance", IEEE, 2012, 11pg.*
Monticelli, A., "Electric Power System State Estimation", IEEE, 2000, 21pg.*
Z. Liu, Z. Chen, H. Sun, and C. Liu, "Control and Protection Cooperation Strategy for Voltage Instability," proceedings of the 47th International Universities Power Engineering Conference, London, UK, Sep. 2012.
Bogdan Otomega, Vincent Sermanson, and Thierry Van Cutsen, "Reverse-Logic Control of Load Tap Changers in Emergency Voltage Conditions," IEEE Bologna Power Tech Conference, Jun. 2003.
PCT/US2014/018666 Patent Cooperation Treaty, International Search Report and Written Opinion of the International Searching Authority, dated Jul. 16, 2014.
Qun Debbie Zhou, "Online Voltage Stability Prediction and Control Using Computational Intelligence Technique," in Doctoral dissertation, The University of Manitoba, Sep. 21, 2010.
PCT/US2014/042806 Patent Cooperation Treaty, International Search Report and Written Opinion of the International Searching Authority, dated Jan. 29, 2015.

* cited by examiner

STATE TRAJECTORY PREDICTION IN AN ELECTRIC POWER DELIVERY SYSTEM

RELATED APPLICATION

The present application claims the benefit under 35 U.S.C. §119(e) of U.S. Provisional Patent Application No. 61/769,487, filed Feb. 26, 2013, and titled "STATE TRAJECTORY PREDICTION IN AN ELECTRIC POWER DELIVERY SYSTEM," which is incorporated herein by reference in its entirety.

TECHNICAL FIELD

This disclosure relates to state trajectory prediction and display in an electric power delivery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
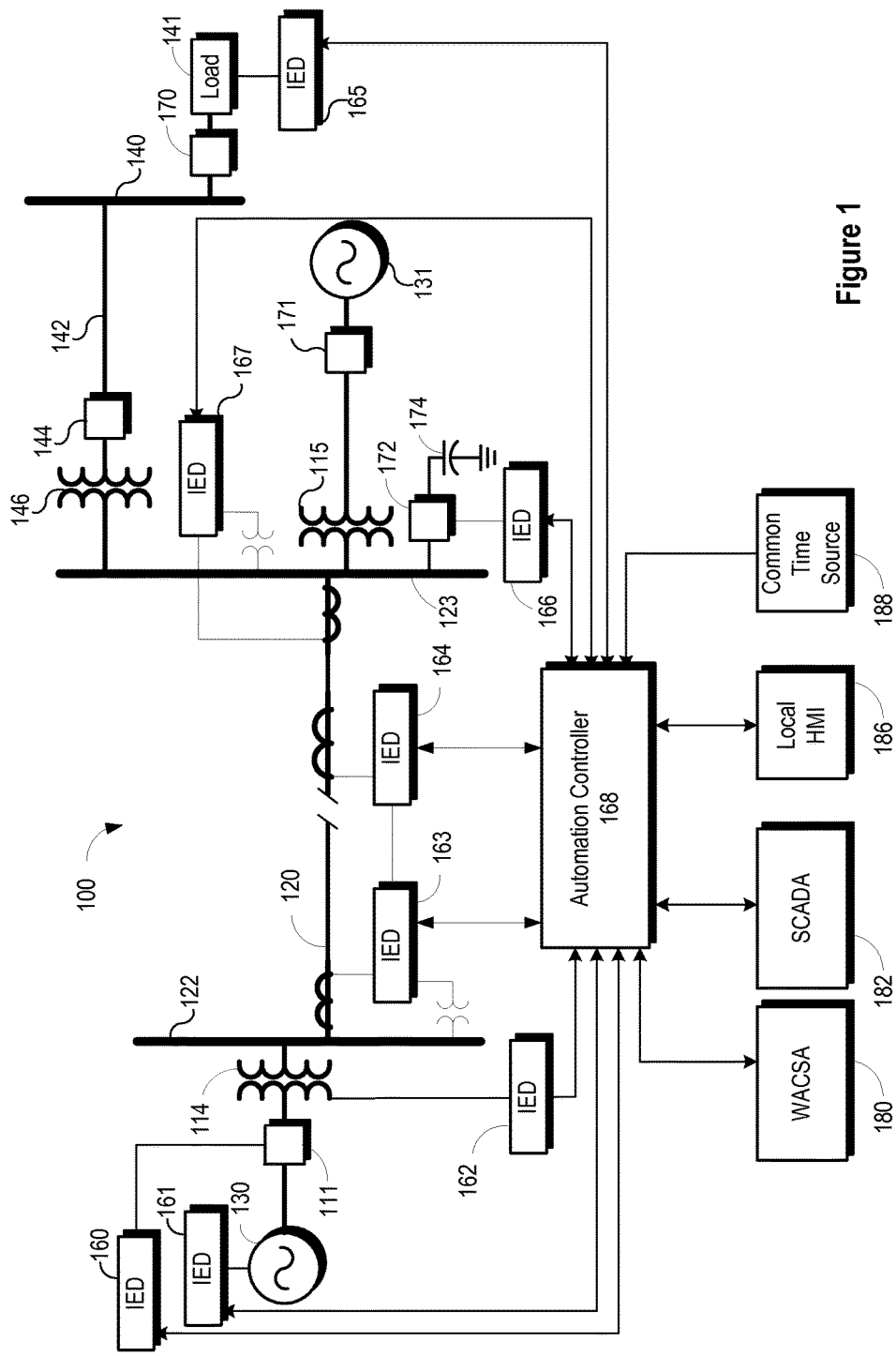
FIG. 1 is a simplified one-line diagram of an electric power delivery system consistent with embodiments of the present disclosure.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electric power delivery systems are designed to generate, transmit, and distribute electric energy to loads. Electric power delivery systems may include equipment such as: machines (electric generators, electric motors, and the like); power transformers, power transmission and delivery lines, circuit breakers, switches, buses, voltage regulators, capacitor banks, and the like. Such equipment may be monitored, controlled, automated, and/or protected using intelligent electronic devices (IEDs) that receive electric power delivery system information from the equipment, make decisions based on the information, and provide monitoring, control, protection, and/or automation outputs to the equipment. As used herein, monitoring, control, protection, and/or automation may generally be referred to as "control" unless otherwise specifically indicated.

In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks. Networking and communication devices may also be integrated into an IED and/or be in communication with an IED. As used herein, an IED may include a single discrete IED or a system of multiple IEDs operating together.

IEDs may communicate with other IEDs, monitored equipment, and/or network devices using one or more suitable communication protocols and/or standards. In certain embodiments one or more IEDs included in an electric power delivery system may communicate using a variety of protocols, such as IEC 61850 GOOSE (Generic Object Oriented Substation Events) and/or a Mirrored Bits® or the like.

FIG. 1 illustrates a simplified diagram of an example of an electric power delivery system 100 consistent with embodiments disclosed herein. The systems and methods described herein may be applied and/or implemented in the system electric power delivery system 100 illustrated in FIG. 1. Although illustrated as a one-line diagram for purposes of simplicity, an electric power delivery system 100 may also be configured as a three-phase power system. The electric power delivery system 100 may include, among other things, electric generators 130 and 131, configured to generate an electric power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

An electric power delivery system may be dynamically controlled to accommodate changes in electrical demand and to provide safe and reliable power. Control actions may aim to avoid events that may drive electric power delivery systems into an unstable state, such as voltage collapse. Voltage collapse generally refers to loads demanding more power than the electric power delivery system (or machines thereof) can deliver. The voltage decreases as a result of the excessive demand, which in in turn results in additional current draw. Resultant current levels may result in further voltage drop, and the effect continues until generation is unable to supply the needed reactive power. Large frequency deviations may be caused by transient imbalances between the supply and consumption of electric power. Another type of instability may be due to structural limitations on the electric power delivery system including the ability to transfer power. One such example is when thermal limitations result in transmission lines being taken out of service. The present disclosure describes various system and methods that may be used to predict a future state of an electric power delivery system. Based on a predicted future state, various control strategies may be implemented to manage the system during times of stress and to improve the reliability of the system.

FIG. 1 illustrates several intelligent electronic devices ("IEDs") 160-167 that may be configured to control the one or more elements of the electric power delivery system. An IED may be any processor-based device that controls monitored equipment within an electric power delivery system (e.g., system 100). IEDs may obtain and/or derive a state of the electric power delivery system. The state may include equipment status, measurements, derived values, and IED state. In some embodiments, the IEDs 160-167 may gather equipment status from one or more pieces of monitored equipment (e.g., generator 130). Equipment status may relate to the status of the monitored equipment, and may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

IEDs may be used to control various aspects of the electric power delivery system. To this end, they may include protection elements such as, for example, an instantaneous overcurrent element; an inverse-time overcurrent element; a thermal element; a reactive power threshold; a distance element; a current differential element; a load encroachment element; an impedance characteristic; a volts/Hz characteristic; an undervoltage element; a directional element; a negative sequence current element; a loss of excitation element; a negative sequence voltage element; an overvoltage element; a ground fault element; a high-impedance fault element; an underfrequency element; an overfrequency element; and the like.

Furthermore, IEDs may include control elements, related to electric power delivery system equipment. Accordingly, an IED may be configured as a reactive power controller, a capacitor bank controller, a transformer tap changing controller, a generator over-excitation limit controller, a governor controller, a power system stabilizer controller, a shunt reactor controller, a DC line controller, an inverter controller, and the like. It should be noted that a single IED may include one or more protection elements and/or control elements.

According to certain embodiments, IEDs 160-167 may issue control instructions to the monitored equipment in order to control various aspects relating to the monitored equipment. Typical control actions may be described as being in one of two categories: namely, discontinuous control, and continuous control.

Discontinuous control actions may be described as modifying a topology of the electric power delivery system. Some examples of discontinuous control actions include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor.

Continuous control actions may be described as control actions that do not modify a topology of the electric power delivery system. Examples of continuous control actions include: adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electric power delivery system 100 illustrated in FIG. 1 may be configured to generate, transmit, and/or receive GOOSE messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electric power delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

As is detailed above, the electric power delivery system 100 illustrated in FIG. 1 includes local control and protection using IEDs 160-167, which may communicate derived values to a WACSA, SCADA, Local HMI, or the like. As described below, a visualization module (of the WACSA, SCADA, Local HMI, or the like) may be used for state visualization, state trajectory prediction, and display of the state trajectory prediction.

The state trajectory prediction (STP) feature of the visualization module (which may include synchrophasor visualization software such as, for example, SynchroWAVe® Central, available from Schweitzer Engineering Laboratories, Inc.) generates a model based prediction of selected power system signals for a set period (for example 30 minutes) into the future. The results may be displayed in various ways, such as a chart or faster-than-real-time movie, and may be updated periodically. In one specific embodiment, a visualization may be updated every 5 seconds. The selected power system signals can include voltages (magnitude and angle), currents (magnitude and angle), power flow (real and imaginary), or other relevant signals.

As used herein, the STP feature differs from a contingency analysis because it dynamically predicts future state values according to a model and best estimate of upcoming topology, generation, and load changes. Systems that include an STP feature may show operators exactly what will happen in the next time interval (for example 30 minutes). This is different than contingency analysis which shows what would happen if various contingencies occur. In other words, a contingency analysis indicates what "might" happen based on the occurrence of certain contingencies in the next time interval (for example 30 minutes), where an STP system may provide a prediction that encompasses foreseeable events and reflects those events in the prediction. In some embodiments, the STP feature may be tied to a confidence interval associated with a predicted future state. In one specific embodiment, the STP may graphically illustrate predicted future states using a predetermined confidence interval. In one specific example, the confidence interval may be approximately 80%.

Various embodiments may utilize a 30 minute time interval because the North American Electric Reliability Corporation (NERC) requires that a power system is brought back into a secure state after any given N−1 contingency within this time period. Other intervals are also possible and are contemplated by the present disclosure.

Figure 2:
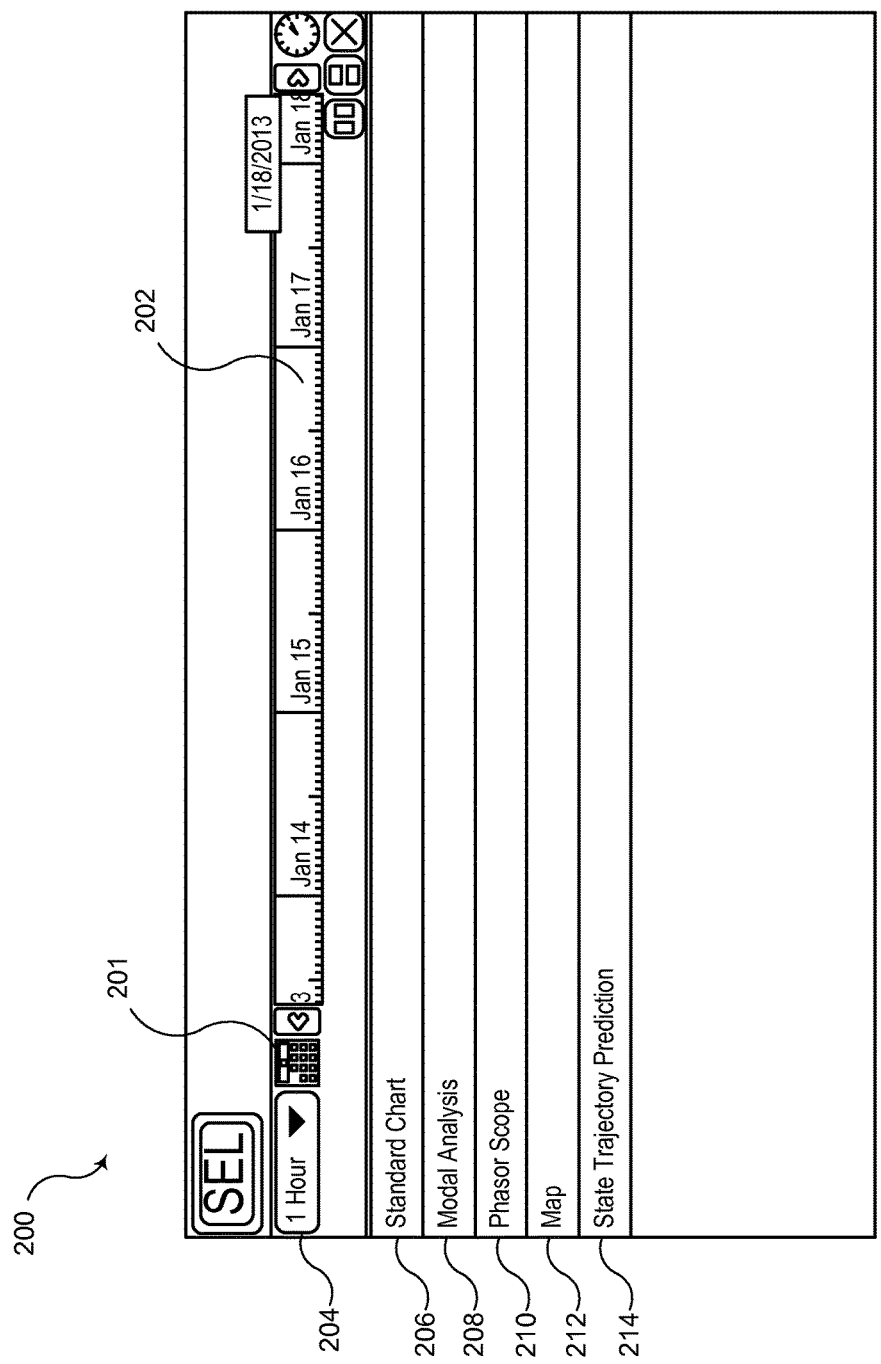
FIG. 2 illustrates a screen capture of a system that may be configured to generate a state trajectory prediction consistent with embodiments of the present disclosure.

FIG. 2 illustrates a screen capture 200 of a system that may be configured to generate a state trajectory prediction consistent with embodiments of the present disclosure. The illustrated screen capture 200 may be displayed on a variety of interfaces distributed throughout an electric power delivery system. For example, the screen capture 200 may be displayed on a local HMI (such as HMI 186 shown in FIG. 1), a display associated with a WACSA system (such as WACSA system 180 shown in FIG. 1), a display associated with a SCADA system (such as SCADA system 182 shown in FIG. 1), and the like.

Returning to a discussion of FIG. 2, the screen capture 200 may provide a calendar 201 and a time range bar 202 that may permit a user to display data from a particular date associated with an electric power delivery system. A selection box 204 may be used to select a variety of lengths of time to be displayed. According to the illustrated embodiment, a user may select one of a standard chart 206, a modal analysis 208, a phasor scope 210, a map 212, and a state trajectory prediction 214 to display.

Figure 3:
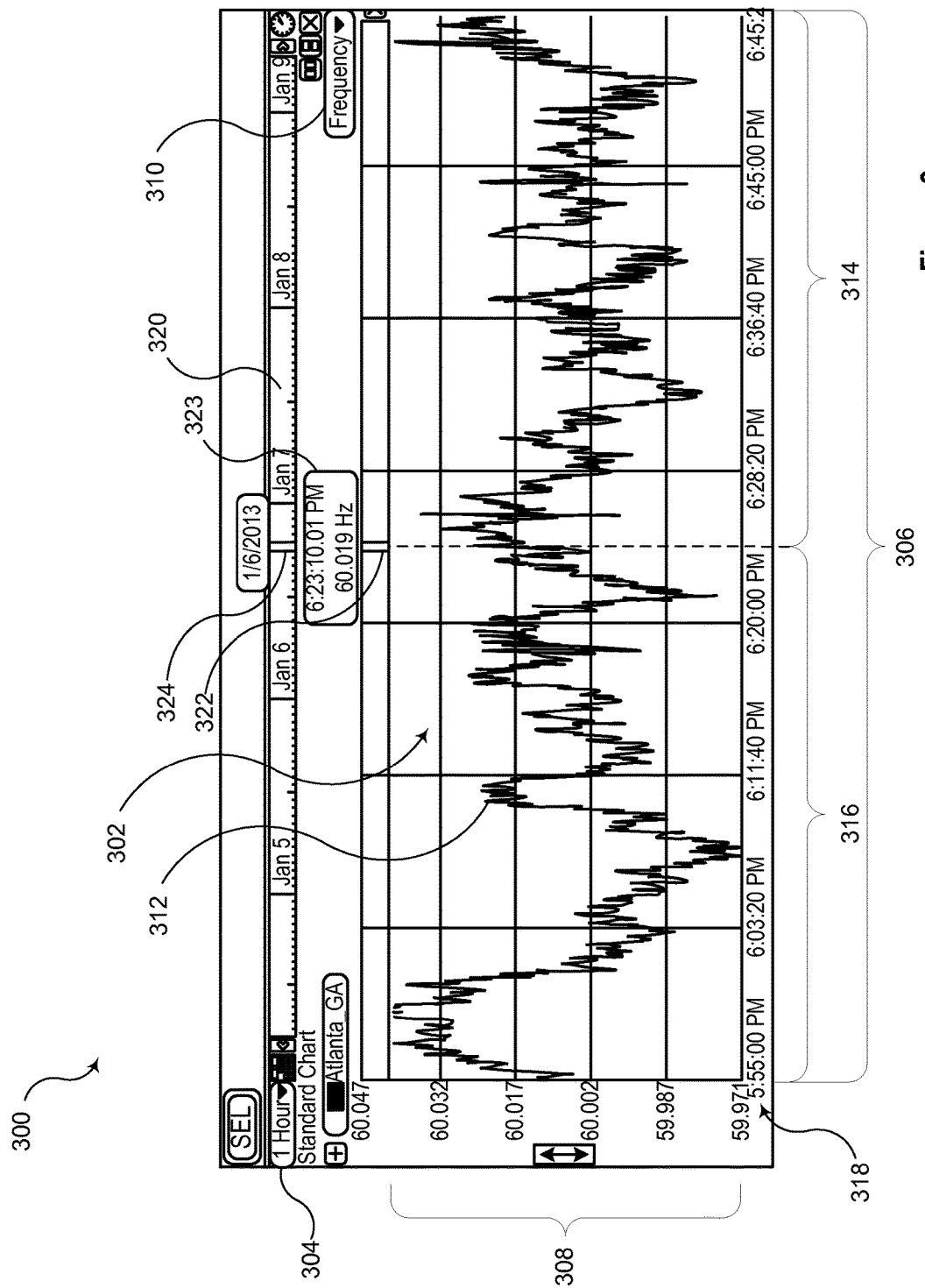
FIG. 3 illustrates a display including a state trajectory prediction consistent with embodiments of the present disclosure.

FIG. 3 illustrates a display 300 including a state trajectory window 302 consistent with embodiments of the present disclosure. In one embodiment, display 300 may be shown after a user selects the state trajectory prediction option 214 from screen capture 200, as illustrated in FIG. 2. Returning to a discussion of FIG. 3, the state trajectory window 302 shows one hour of data 312. A selection box 304 may be used to select a variety of lengths of time to be displayed in the state trajectory window 302. The right half 314 of the state trajectory window 302 may show future states, while the left half 316 of the state trajectory window 302 shows actual values for past states. In the illustrated embodiment, future states may be shown for a period of 30 minutes into the future. The chart may be configured to display updates when all displays are in real-time mode. The state trajectory window 302 may include a time-range bar 320. Time-range bar 320 may display a relatively large time span, including all historical data stored by a related system. A scrubber 324 may be positioned along time-range bar 320 to select a particular area of interest that is displayed, at least partially, in state trajectory window 302. In the illustrated embodiment, state trajectory window 302 displays 1 hour of time, as displayed along axis 318. In some embodiments, a cursor 322 may display instantaneous data values in a data window 323. In the illustrated embodiment, cursor 322 is displaying a real-time value. As may be appreciated, the cursor 322 may be repositioned at various points of historical data and associated measurements may be displayed in data window 323.

Display 300 shows time along the horizontal axis 306 and a measured frequency along the vertical axis 308. A selection box 310 may be used to select another parameter to be displayed in the state trajectory window 302. According to various embodiments, selection box 310 may allow for an operator to display one or more of a voltage magnitude, a voltage angle, a current magnitude, a current angle, a real power measurement, a reactive power measurement, and the like.

Figure 4:
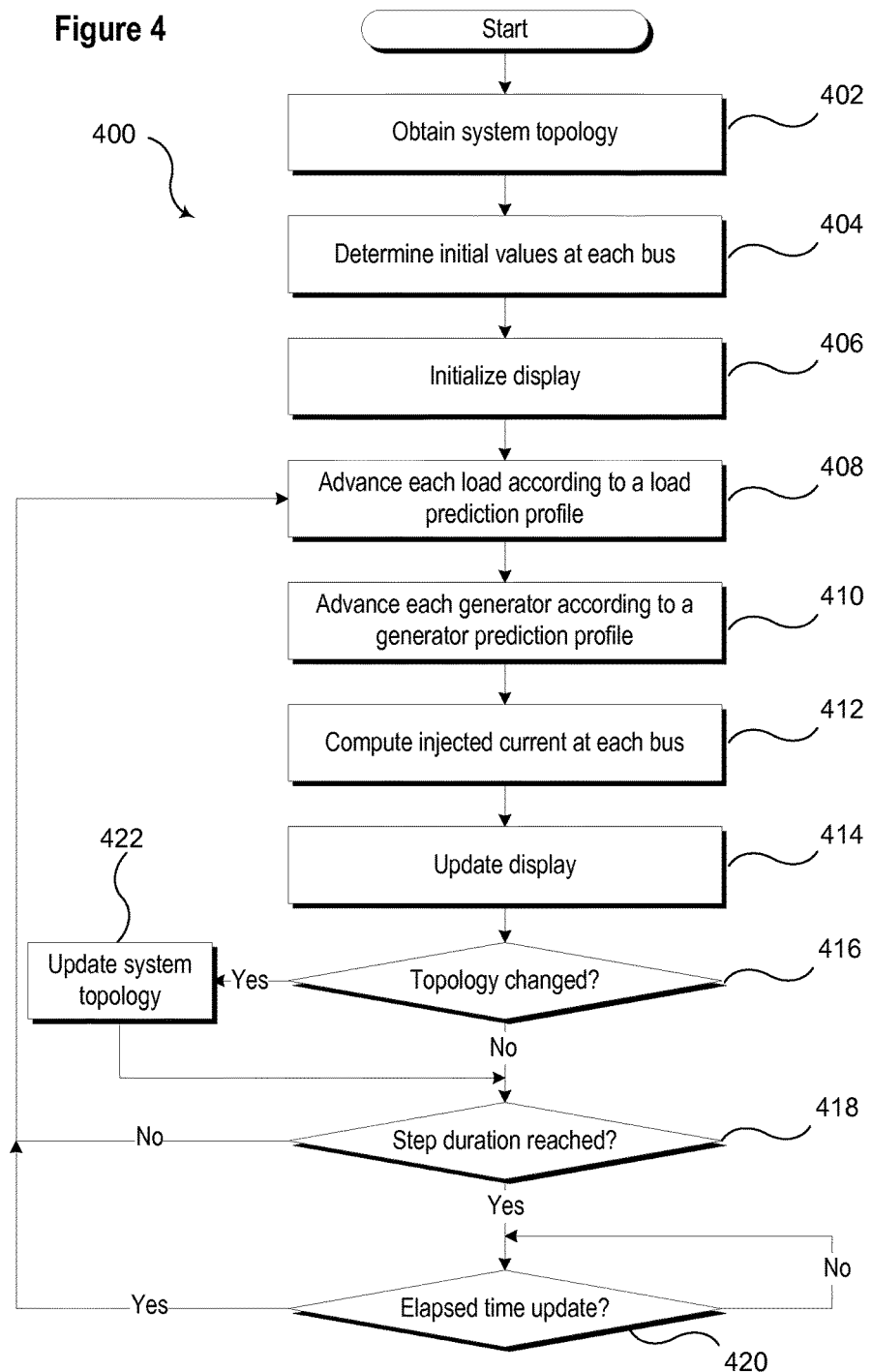
FIG. 4 illustrates a flow chart of a method for generating a state trajectory prediction of an electric power delivery system consistent with embodiments of the present disclosure.

FIG. 4 illustrates a flow chart of a method 400 for generating a state trajectory prediction of an electric power delivery system consistent with embodiments of the present disclosure. At 402, a system topology may be obtained. The topology may identify interconnections, impedance values, and models of devices in an electric power delivery system. Such devices may include, for example, generators, loads, static VAR compensators, shunt capacitors, series capacitors, relays, sectionalizers, disconnect switches, breakers, and the like. According to some embodiments, the topology of a system may be specified by a user. In other embodiments, automated processes may be used to determine connections, parameters, and models of various components in the system. Mathematical models of various components may be used to predict responses (e.g., system frequency, device state, etc.) of various components to future conditions. In still further embodiments, topology may be provided using manual input and automated processes. Missing values may be estimated using a single-step linear calculation.

At 404, initial values at each bus in the electric power delivery system may be determined. The initial values may, in some embodiments, be provided by real-time synchrophasor measurements taken from the electric power delivery system. In other embodiments, the initialized values may be nominal values that facilitate rapid convergence to an operating condition. In one embodiments the initial values may comprise measurements of currents used in a power-flow model. The power-flow model may be used to generate estimates of other parameters (e.g., voltage, frequency, etc.) of the electric power delivery system. In some embodiments, each bus with positive power flow may be marked as a generator, while each bus with a negative power flow may be marked as a load. At 406, a display may be initialized. In certain embodiment, the display may be similar to display 300 illustrated in FIG. 3.

In one specific embodiment, a power-flow engine may be initialized at 404 with time-synchronized complex voltage and optionally with current measurements. The voltage and current measurements may be defined as $V_{meas}$ and $I_{meas}$. The values are arranged as an N×1 column vector, where N is the number of buses in the system. Each bus with positive power flow is marked as a generator. Generator power is computed as $P=V_{meas} \cdot I^*_{calc}$. Each bus with negative power flow is marked as a load. Load power is computed the same way.

Returning to a discussion of FIG. 4, at 408, each load may be advanced according to a respective load prediction profile. Similarly, at 410, each generator may be advanced according to a respective generator prediction profile. A mathematical model may represent an expected response of a component in the electric power delivery system using various inputs. An appropriate model may be developed for various loads, generators, IEDs, and other components in the electric power delivery system. Each load prediction profile and each generator prediction profile may be advanced by one step interval in each iteration. The step interval may vary in various embodiments. In one example, the step interval may be one minute. In another example, the step interval may be 5 seconds. A wide range of step intervals are contemplated by the present disclosure. A predicted response of an electric power delivery system may be determined at a time in the future corresponding to each step interval.

In some embodiments, a plurality of values associated with each generator prediction profile and each load prediction profile may be determined at 408 and 410. In some embodiments, the plurality of predicted responses of each load may be based on an increase in the load, a decrease in the load, or the load remaining constant. Similarly, in some embodiments, the plurality of predicted responses of each generator may be based on an output of the generator increasing, decreasing, or remaining constant. The plurality of values determined at 408 and 410 may further be used to determine a confidence interval associated with the predicted responses of each generator and each load.

Injected currents may be calculated at each bus at 412 based on the load prediction profile determined at 408 and the generator prediction profile determined at 410. In one specific embodiment, the power-flow engine may compute the injected currents at each bus using Eq. 1.

$$I_{calc}=Y \cdot V_{meas} \qquad \text{Eq. 1}$$

In Eq. 1, Y may be an N×N matrix that is established by the topology of an electric power delivery system and set admittances. The display may be updated with the values computed at 414. At each stepped load a new set of voltages and currents are calculated from a load-flow. These are defined as $V_{predicted}[k]$ and $I_{predicted}[k]$, where k=0, ..., x, and x is the number of steps. The determined values may be used to update the plurality of time-synchronized complex electric power delivery system values at each stepped load based on the injected currents at each bus.

Advancing models of generator prediction profiles and load prediction profiles may be made according to an appropriate model, for example, a constant-power model. The prediction profiles may be developed in stages. The load prediction profiles and generator prediction profiles may be set according to measurements from previous measurements (for example a specific day, where the day is selectable). Prediction profiles may also be set according to predefined equations. The state trajectory prediction may save its predictions and may then compare prior predictions to actual states profile of the network. Based on differences between predictions and actual variables, the load prediction profile and generator prediction profile may be updated to more accurately predict performance.

In various embodiments, mechanisms and procedures may be implemented to detect inconsistencies or errors associated with a generator prediction profile, a load prediction profile, and/or power flow determinations. In one specific embodiment, the classification of a bus as either generator or load must correspond to the expected use by a load prediction profile or a generator prediction profile. If a mismatch occurs (e.g., a bus showing positive power flow, but being modeled using a load prediction profile), a warning may be issued and/or further iterations of method 400 may cease until the mismatch is resolved. According to some embodiments, a warning may be placed in the logs to note the occurrence of the mismatch. In another specific embodiment, non-convergence at any step in a power flow analysis may generate an error. The error may be noted in a log, may be indicated on a display, and/or may suspend further updates of a display.

Various systems configured to implement method 400 may be configured to address changes in topology of an electric power delivery system. For example, a relay may operate to disconnect a line. If the disconnected line is included in one or more generator or load prediction profiles, then the relay action may be included in future predictions. At 416, method 400 may determine whether a topology change has occurred, and if so, the system topology may be updated at 422. In certain embodiments, topology changes may be anticipated, for example based on IED models. Further, various scenarios may also be simulated to guard against a "worst case" scenario. For example, the "worst case" scenario may involve failure of one or more components (e.g., transmission lines, generators, etc.) in the system.

At 418, method 400 may determine whether a step duration has been reached. As used herein the term step duration refers to length of time in the future that is predicted by a state trajectory prediction system. In one embodiment, the step duration may be 30 minutes. In this embodiment, the state trajectory prediction system may predict the state of the electric power delivery system 30 minutes into the future. The number of iterations through elements 408-418 for a given step duration may depend on the step interval selected. For example, for a step duration of 30 minutes and a step interval of one minute, 30 iterations of elements 408-418 may be performed. In another embodiment, a five second step interval may be used with a 30 minute step interval, resulting in 600 iterations for the 30 minute step interval.

The following steps repeat every five seconds. The five second interval is for illustration and other intervals are possible. It is not critical to the invention the exact interval. Five seconds is a good choice because it is fast enough to show rapidly changing events but not too fast such that the display is difficult to see. In an alternate embodiment, the following steps repeat once, after a contingency has occurred (for example, after the loss of a key transmission line).

At 420, method 400 may determine whether an amount of time has elapsed that necessitates an update to the state trajectory prediction. For example, in a system that updates every 5 seconds and has a step duration of 30 minutes, at least one update may be performed every 5 seconds to ensure that the latest state trajectory prediction is always 30 minutes in the future.

In one embodiment, a software architecture implementing method 400 may cause the power-flow calculations and chart trajectory displays to operate in parallel. The power-flow may determine values for the next chart display and buffers the results until the next display window. The time to complete one-power flow iteration may be determined based on the time into the future that a state is to be predicted (e.g., 30 minutes), the time duration of each interval (e.g., 1 minute), and the frequency at which updated information is displayed (e.g., 5 seconds). Using the specific values set forth in the prior sentence, a system implementing method 400 may be configured to complete one power-flow iteration every 167 milliseconds.

Figure 5:
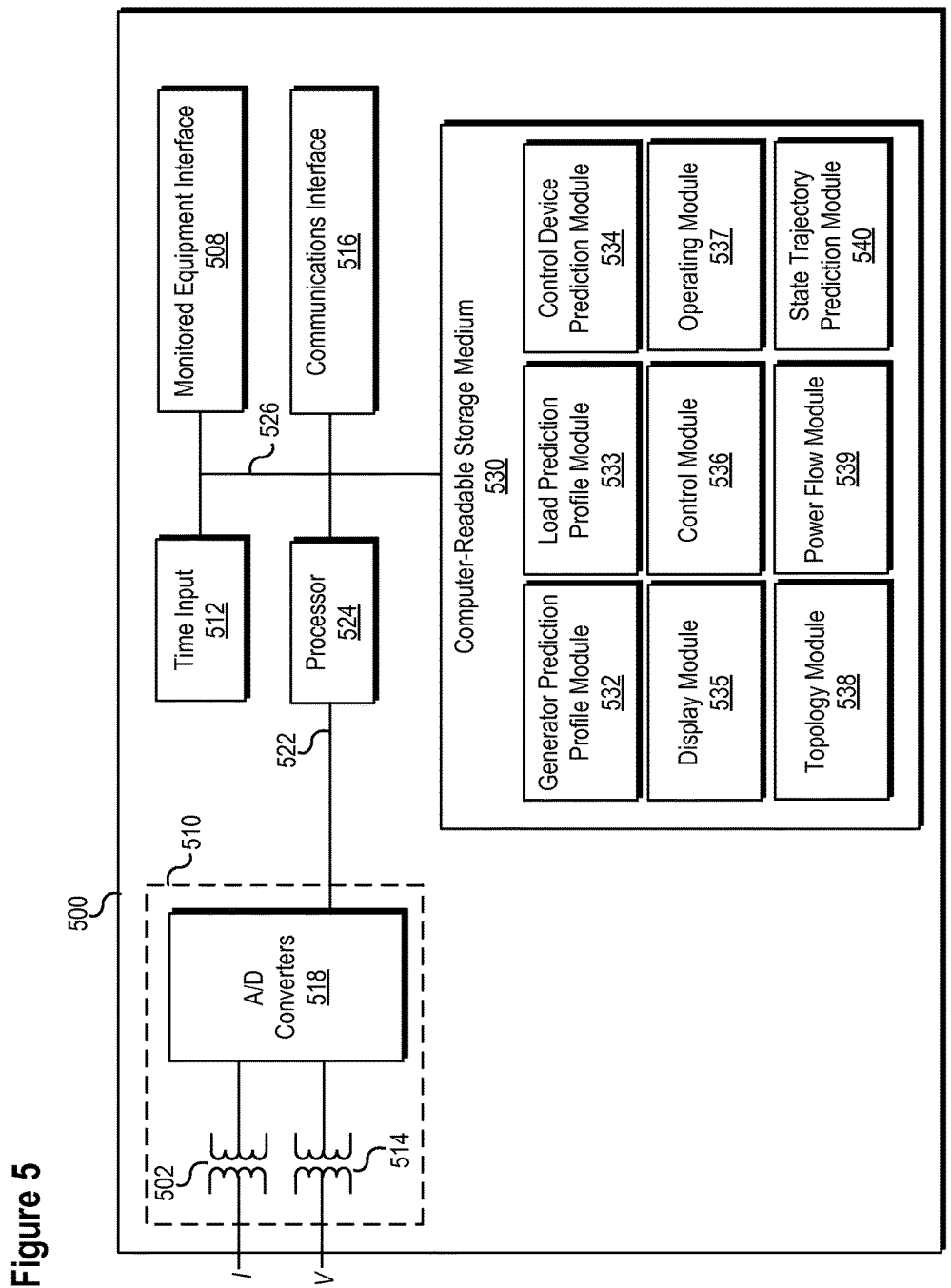
FIG. 5 illustrates a functional block diagram of a system configured to generate a state trajectory prediction consistent with embodiments of the present disclosure.

FIG. 5 illustrates a functional block diagram of a system configured to generate a state trajectory prediction consistent with embodiments of the present disclosure. In certain embodiments, the system 500 may comprise an IED system configured to, among other things, generate a state trajectory prediction consistent with embodiments of the present disclosure. System 500 may be implemented in an IED using hardware, software, firmware, and/or any combination thereof. Moreover, certain components or functions described herein may be associated with other devices or performed by other devices. The specifically illustrated configuration is merely representative of one embodiment consistent with the present disclosure.

IED 500 includes a communications interface 516 configured to communicate with other IEDs and/or system devices. In certain embodiments, the communications interface 516 may facilitate direct communication with another IED or communicate with another IED over a communications network. Communications interface 516 may facilitate communications with multiple IEDs. IED 500 may further include a time input 512, which may be used to receive a time signal (e.g., a common time reference) allowing IED 500 to apply a time-stamp to the acquired samples. In certain embodiments, a common time reference may be received via communications interface 516, and accordingly, a separate time input may not be required for time-stamping and/or synchronization operations. One such embodiment may employ the IEEE 1588 protocol. A monitored equipment interface 508 may be configured to receive status information from, and issue control instructions to, a piece of monitored equipment (such as a circuit breaker, conductor, transformer, or the like).

Processor 524 may be configured to process communications received via communications interface 516, time input 512, and/or monitored equipment interface 508. Processor 524 may operate using any number of processing rates and architectures. Processor 524 may be configured to perform various algorithms and calculations described herein. Processor 524 may be embodied as a general purpose integrated circuit, an application specific integrated circuit, a field-programmable gate array, and/or any other suitable programmable logic device.

In certain embodiments, IED 500 may include a sensor component 510. In the illustrated embodiment, sensor component 510 is configured to gather data directly from a conductor (not shown) and may use, for example, transformers 502 and 514 and A/D converters 518 that may sample and/or digitize filtered waveforms to form corresponding digitized current and voltage signals provided to data bus 522. A/D converters 518 may include a single A/D converter or separate A/D converters for each incoming signal. A current signal may include separate current signals from each phase of a three-phase electric power system. A/D converters 518 may be connected to processor 524 by way of data bus 522, through which digitized representations of current and voltage signals may be transmitted to processor 524. In various embodiments, the digitized current and voltage signals may be used to calculate the location of a fault on an electric power line as described herein.

Computer-readable storage medium 530 may be the repository of various software modules configured to perform any of the methods described herein. A data bus 526 may link monitored equipment interface 508, time input 512, communications interface 516, and computer-readable storage medium 530 to processor 524.

Computer-readable storage medium 530 may comprise a plurality of software modules configured to perform various functions described herein. According to certain embodiments, modules may include a generator prediction profile module 532, a load prediction profile module 533, a control device prediction module 534, a display module 535, a control module 536, an operating module 537, a topology module 538, a power flow module 539, and a state trajectory prediction module 540.

A generator prediction profile module 532 may be configured to produce one or more mathematical models that may represent one or more generators in an electric power delivery system. The generator prediction profile(s) may be configured to predict the response of one or more generators to future conditions. A future state of the electric power delivery system may be determined, at least in part, based on the models generated by the generator prediction profile module 532.

A load prediction profile module 533 may be configured to produce one or more mathematical models that may represent one or more loads in the electric power delivery system. The load prediction profile(s) may be configured to predict the response of one or more loads to future conditions. A future state of the electric power delivery system may be determined, at least in part, based on the models generated by the generator prediction profile module 532.

A control device prediction module 534 may be configured to produce one or more mathematical models that may represent one or more control devices in the electric power delivery system. For example, a relay may be configured to operates once its measured voltages and currents translate into an operate region. This is modeled and the relevant line, transformer, or other asset is removed from service in the model, as anticipated it would be in the actual power system. The control device prediction module may be configured to predict the response of one or more control devices to future conditions. A future state of the electronic power generation and delivery system may be determined, at least in part, based on models generated by the control device prediction module 534.

In any of generator prediction profile module 532, load prediction profile module 533, and/or control device prediction module 534, differential equation models of the generators, generator controllers, renewable sources, loads, network control devices (e.g., static VAR compensators) may be used. Over time, the models may be improved or tuned by comparing predicted values to actual values and adjusting various parameters to more accurately reflect the response of a component to various conditions.

A control module 536 may be configured to implement continuous or discontinuous control actions in the electric power delivery system. Such control actions may include, for example, selectively disconnecting loads, increasing or decreasing generation capacity, adding or removing reactive power support, adjusting network topology, etc. The actions of control module 536 may be integrated into a state trajectory prediction. In some embodiments, control actions may be anticipated and incorporated into the state trajectory prediction before such actions are actually implemented.

An operating module 537 may be configured to collected data during operation of various generators, loads, and/or control devices that are modeled by any of generator prediction profile module 532, load prediction profile module 533, and/or control device prediction module 534. Data collected by the operating module 537 may be used to tune or refine the various models in order to more accurately predict the response of the generator to various operating conditions.

A topology module 538 may be configured to determine a topology of an electric power delivery system. Further, operating module 537 may operate in conjunction with topology module 538 to identify events in the electric power delivery system and determine changes in the topology of the system. Topology module 538 may be configured to identify nodes in the electric power delivery system associated with islands.

A power flow module 539 may comprise a power-flow model representing at least a portion of the electric power delivery system. According to some embodiments, multiple representations of portions of the system may be used to represent the entire system. In other embodiments, the system may be represented by a single model. The power flow module 539 may be configured to analyze the power flow through the system based, at least in part, upon the predicted responses generated by the generator profile prediction module 532, the load prediction profile module 533, and/or the control device prediction module 534.

A state trajectory prediction module 540 may be configured to predict the state of the electric power delivery system in the future. State trajectory prediction module may utilize the data generated by one or more of the other modules to generate a state trajectory prediction. According to some embodiments, the state trajectory prediction may represent a specified period of time into the future. In one specific embodiment, the specific period of time may be 30 minutes.

A display module 535 may be configured to provide a graphical representation of the predicted state of the electric power delivery system generated by the state trajectory prediction module 540. The graphical representation may, according to one embodiment, be similar to the display illustrated in FIG. 3. In another embodiment, the graphical representation may be similar to the display illustrated in FIG. 6 or FIG. 7A-7C. The graphical representations illustrated in FIG. 3, FIG. 6, and FIG. 7A-7C are merely examples and are not exhaustive of the types of graphical displays contemplated by the present disclosure.

Figure 6:
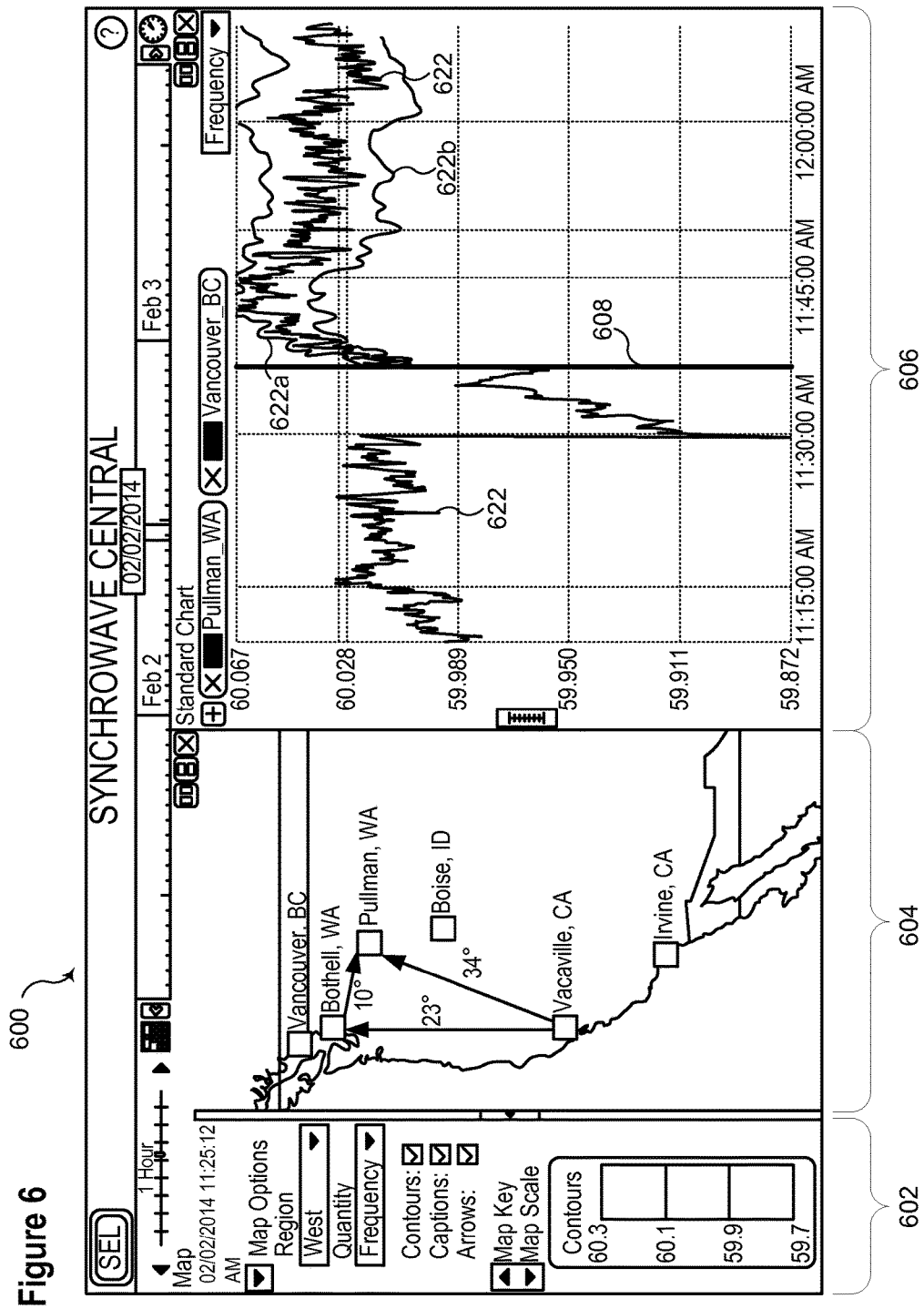
FIG. 6 illustrates a screen capture showing a display of a parameter over a period of time extending into the future and associated with a confidence interval consistent with embodiments of the present disclosure.

FIG. 6 illustrates a screen capture showing a display 600 of a parameter 622 over a period of time extending into the future and associated with a confidence interval 622a, 622b consistent with embodiments of the present disclosure. Display 600 includes three divisions, namely a settings window 602, a map window 604 and a state trajectory prediction window 606. In some embodiments, the settings window 602 may be collapsed so that additional space on the display 600 may be allocated to the map window 604 and the state trajectory prediction window 606.

State trajectory prediction window 606 may display a representation of one parameter of an electric power distribution system. In the illustrated embodiment, the parameter is a system frequency. A divider 608 may separate historical data (i.e., values of parameter 622 displayed to the left of divider 608) from predicted values of the parameter (i.e., values of parameter 622 displayed to the right of divider 608).

In addition to predicting values of parameter 622, a confidence interval band 622a, 622b may also be displayed. In one embodiment the confidence interval band 622a, 622b may represent a predetermined confidence interval (e.g., an 80% confidence interval). As illustrated, the confidence interval band may spread out as the distance of the prediction into the future increases. An operator of an electric power distribution system associated with display 600 may monitor the predicted values of the parameter (i.e., values of parameter 622 displayed to the right of divider 608) to watch for signs of instability in the electric power distribution system. Further, the confidence interval 622a, 622b may provide the operator with an assessment of the likelihood of the occurrence of various conditions so that appropriate action may be taken.

Figure 7A:
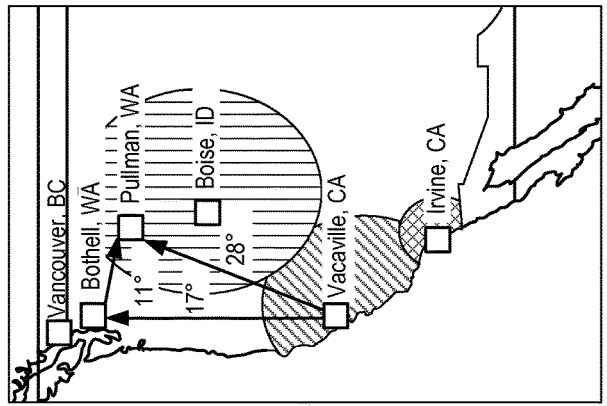
FIGS. 7A-7C illustrate a series of images taken from a display of a state trajectory system configured to illustrate a faster-than-real-time illustration of a predicted state consistent with embodiments of the present disclosure.
Figure 7B:
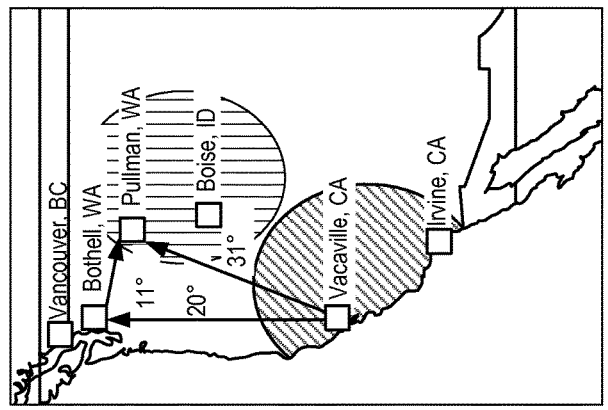
Figure 7C:
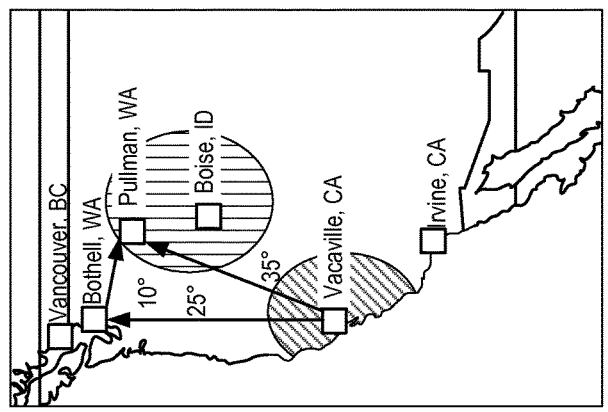

FIGS. 7A-7C illustrate a series of images taken from a display of a state trajectory system configured to illustrate a faster-than-real-time illustration of a predicted state consistent with embodiments of the present disclosure. In the illustrated embodiment the illustration is overlaid on a map of a portion of the United States. FIG. 7A may illustrate a real-time display in which power flows between Vacaville, Calif., Bothell, Wash., and Pullman, Wash. are shown. Further, the display may provide an indication of the relative phase angles between these locations. A nominal frequency may appear without shading on the map. Areas having an abnormal frequency may be shaded. For example, an area of abnormal frequency is shown in the area surrounding Vacaville, Calif. and in the region encompassing Boise, Id. and Pullman, Wash. Severity of the abnormality may be indicated by the shading. In the illustrated embodiment, three phases (i.e., Phase I, Phase II, and Phase III) are illustrated, and may represent increasingly severe departures from a nominal frequency.

FIG. 7B illustrates a first predicted future state of the electric power distribution system based on a state trajectory estimation system. As illustrated, the areas of abnormal frequency have expanded geographically. Further, the phase angles illustrated on the display have changed. As may be appreciated, a state trajectory prediction system may generate a plurality of images between the images shown as FIG. 7A and FIG. 7B. In some embodiments, a continuously updating movie may be displayed that starts from a present condition and illustrates the predicted state over a period of time extending into the future. The movie may be updated and restart at a fixed interval (e.g., every 5 seconds, every 30 seconds, every minute, etc.).

FIG. 7C illustrates a second predicted future state of the electric power distribution system based on the state trajectory estimation. In comparison to FIG. 7B, the areas of abnormal frequency have again expanded geographically. Further an area in Phase III is predicted to develop in the area surrounding Irvine, Calif. The predicted state illustrated in FIG. 7C may signal to an operator that the electric power distribution system is progressing toward an unstable condition and that remedial action should be implemented. More specifically, the progression may show that the electric power distribution system is progressing toward voltage collapse.

In one specific embodiment, the span of time between FIG. 7A and FIG. 7C may be approximately 30 minutes. This amount of time may allow an operator to observe progression of conditions indicative of potential instability and provide sufficient time to implement remedial action that does avoids or reduces the potential for instability and/or interruptions in electrical service provided by the electric power distribution system. A geographical map that provides a faster-than-real-time movie of the next time interval (for example 30 minutes) into the future is provided.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for state trajectory prediction in an electric power delivery system, comprising:
   a data communication network configured to gather a plurality of values based on measurements associated with the electric power delivery system;
   a power flow calculation subsystem configured to:
      initialize a plurality of time-synchronized complex values representing electrical conditions at a plurality of buses in the electric power delivery system;
      identify each bus with positive power flow as a generator; and
      identify each bus with a negative power flow as a load;
   a state trajectory prediction system in communication with the data communication network and configured to receive the values and to use the values to develop:
      a load prediction profile associated with at least one bus identified as a load and based, at least in part, on the measurements of the electric power delivery system and the plurality of time-synchronized complex values, the load prediction profile configured to provide a predicted response of a load at a future time;
      a generator prediction profile associated with at least one bus identified as a generator and based, at least in part, on the measurements of the electric power delivery system and the plurality of time-synchronized complex values, the generator prediction profile configured to provide a predicted response of a generator at the future time;
      a plurality of predicted values configured to represent the electric power delivery system over a period of time and determined based on an iterative computation of the predicted response of the load and the prediction response of the generator at a plurality of step intervals;
      a state trajectory prediction configured to represent a future state of the electric power delivery system based, at least in part, on the plurality of predicted values, the plurality of time-synchronized complex values, and identification of each bus; and
   a control system configured to implement a control action based, at least in part, on the state trajectory prediction.

2. The system of claim 1, wherein each of the plurality of step intervals comprises about 5 seconds.

3. The system of claim 1, wherein the state trajectory estimation system further comprises a display subsystem configured to display a representation of the future state of the electric power delivery system.

4. The system of claim 3, wherein the display subsystem is further configured to provide a graph representing at least one metric of the future state of the electric power delivery system.

5. The system of claim 4, wherein the graph represents one of a frequency, a voltage magnitude, a voltage angle, a current magnitude, a current angle, a real power magnitude, and a reactive power magnitude.

6. The system of claim 3, wherein the display system is further configured to provide a map configured to display the at least one of the predicted response of the load and the predicted response of the generator over a period of time that encompasses the future time.

7. The system of claim 1, wherein the period of time comprises approximately 30 minutes.

8. The system of claim 1, further comprising a control device prediction profile configured to provide a predicted response of a control device at the future time; and wherein the state trajectory prediction is further based on the predicted response of the control device.

9. The system of claim 1, further comprising a topology determination sub-system configured to determine changes to a topology of the electric power delivery system; and
wherein the state trajectory prediction is further developed based, at least in part, on the topology of the electric power delivery system.

10. A method for predicting a state trajectory in an electric power delivery system, comprising:
receiving a plurality of values based on measurements associated with an electric power delivery system;
initializing a plurality of time-synchronized complex values representing electrical conditions at a plurality of buses in the electric power delivery system;
identifying each bus with positive power flow as a generator;
identifying each bus with a negative power flow as a load;
obtaining a topology of the electric power delivery system;
determining a predicted response of a load at a future time using a load prediction profile;
determining a prediction response of a generator at a future time using a generator prediction profile;
iteratively computing a plurality of values representing the electric power delivery system over a period of time based on the predicted response of the load and the prediction response of the generator;
generating a state trajectory prediction representing a future state of the electric power delivery system based, at least in part, on the load prediction profile and the generator prediction profile;
implementing a control action based, at least in part, on the state trajectory prediction.

11. The method of claim 10, wherein the predicted response of the load is determined by iteratively advancing the load prediction profile using a power flow calculation system over a plurality of step intervals.

12. The method of claim 10, wherein the predicted response of the generator is determined by iteratively advancing the generator prediction profile using a power flow calculation system over a plurality of step intervals.

13. The method of claim 10, further comprising displaying a representation of the future state of the electric power delivery system.

14. The method of claim 13, wherein the representation of the future state of the electric power delivery system comprises one of a graph and a map, the graph and the map representing at least one metric of the future state of the electric power delivery system.

15. The method of claim 10, further comprising determining a predicted response of a control device at the future time; and wherein generating the state trajectory prediction is further based on the predicted response of the control device.

16. A system for state trajectory prediction in an electric power delivery system, comprising:
a bus;
a processor in communication with the bus; and
a non-transitory computer-readable storage medium, comprising:
a load prediction profile module executable on the processor and configured to provide a predicted response of a load at a future time;
a generator prediction profile module executable on the processor and configured to provide a predicted response of a generator at the future time;
a power flow module executable on the processor and configured to:
initialize a plurality of time-synchronized complex values representing electrical conditions at a plurality of buses in the electric power delivery system;
identify each bus with positive power flow as a generator; and
identify each bus with a negative power flow as a load;
determine a plurality of predicted values configured to represent the electric power delivery system over a period of time and determined based on an iterative computation of the predicted response of the load and the prediction response of the generator at a plurality of step intervals; and
a state trajectory prediction module executable on the processor and configured to predict a future state of the electric power delivery system based, at least in part, on the plurality of predicted values.

17. The system of claim 16, further comprising:
a control device prediction module executable on the processor and configured to provide a predicted response of a control device at the future time; and
wherein the state trajectory prediction is further based on the predicted response of the control device.

18. The system of claim 16, further comprising:
a topology module executable on the processor and configured to determine changes to a topology of the electric power delivery system; and
wherein the state trajectory prediction is further based on the topology of the electric power delivery system.

19. A system for state trajectory prediction in a wide-area electric power delivery system, comprising:
a data communication network configured to gather a plurality of values based on measurements associated with the electric power delivery system at a plurality of geographically distributed locations;
a state trajectory prediction system in communication with the data communication network and configured to receive the values and to use the values to develop:
a load prediction profile based, at least in part, on the measurements of the wide-area electric power delivery system, the load prediction profile configured to provide a plurality of predicted responses of a load at a future time;
a generator prediction profile based, at least in part, on the measurements of the electric power delivery system, the generator prediction profile configured to provide a plurality of predicted responses of a generator at the future time;
a plurality of predicted values configured to represent the electric power delivery system over a period of time and determined based on an iterative computation of the plurality of predicted responses of the load and the plurality of prediction responses of the generator at a plurality of step intervals;
a state trajectory prediction configured to represent a future state of the wide-area electric power delivery system based, at least in part, on the plurality of predicted responses of the load and the plurality of predicted responses of the generator; and
a control system configured to implement a control action based, at least in part, on the state trajectory prediction.

20. The system of claim 19, wherein the plurality of predicted responses of the load comprise at least one of an increase in the load and a decrease in the load.

21. The system of claim 19, wherein the plurality of predicted responses of the generator comprise at least one of an increase in output of the generator and a decrease in the output of the generator.

22. The system of claim 19, wherein the generator comprises a renewable generation source and the plurality of predicted responses of the generator comprise a range of output from the renewable generation source.

23. The system of claim 19, wherein the state trajectory prediction system is further configured to develop a confidence interval associated with the state trajectory prediction based on the plurality of predicted responses of the load and the plurality of predicted responses of the generator.

24. The system of claim 23, where in the confidence interval comprises about an 80% confidence interval.

25. The system of claim 9, wherein the control action comprises a discontinuous control action and the topology determination sub-system is further configured to develop the state trajectory prediction based on an updated topology following the discontinuous control action.

26. The system of claim 1, wherein the future state represents at least one future event associated with a confidence interval exceeding a threshold.

27. The system of claim 1, wherein the period of time is specified by a North American Electric Reliability Corporation following an N−1 contingency.

* * * * *